(12) United States Patent
Ginter et al.

(10) Patent No.: US 11,125,188 B2
(45) Date of Patent: Sep. 21, 2021

(54) HYDROGEN AND ELECTRIC POWER CO-PRODUCTION SYSTEM AND METHOD

(71) Applicant: Caterpillar Inc., Deerfield, IL (US)

(72) Inventors: David M. Ginter, Peoria, IL (US); Mark W. Scaife, Cambs (GB); Ronald G. Silver, Peoria, IL (US); Jaswinder Singh, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 16/531,316

(22) Filed: Aug. 5, 2019

(65) Prior Publication Data
US 2021/0040916 A1 Feb. 11, 2021

(51) Int. Cl.
| | |
|---|---|
| *F02M 21/02* | (2006.01) |
| *H01M 8/0612* | (2016.01) |
| *F02M 26/22* | (2016.01) |
| *F02M 26/34* | (2016.01) |
| *F02M 26/51* | (2016.01) |
| *F02M 21/04* | (2006.01) |

(52) U.S. Cl.
CPC .... *F02M 21/0206* (2013.01); *F02M 21/0245* (2013.01); *F02M 21/04* (2013.01); *F02M 26/22* (2016.02); *F02M 26/34* (2016.02); *F02M 26/51* (2016.02); *H01M 8/0618* (2013.01)

(58) Field of Classification Search
CPC ............... F02M 21/0206; F02M 26/51; F02M 21/0245; F02M 26/34; F02M 21/04; F02M 26/22; H01M 8/0618
See application file for complete search history.

(56) References Cited

U.S. PATENT DOCUMENTS

| | | | |
|---|---|---|---|
| 6,521,204 B1* | 2/2003 | Borup | C01B 3/48 |
| | | | 423/652 |
| 6,534,552 B2* | 3/2003 | Benham | C10G 2/32 |
| | | | 518/700 |
| 7,014,930 B2 | 3/2006 | Daniel et al. | |
| 7,059,277 B2 | 6/2006 | Matsuoka | |
| 7,802,434 B2* | 9/2010 | Varatharajan | F02C 1/002 |
| | | | 60/780 |
| 8,747,496 B2 | 6/2014 | Neels et al. | |
| 9,926,844 B2* | 3/2018 | Fujita | H01M 8/04716 |
| 10,260,460 B2 | 4/2019 | Singh et al. | |
| 10,655,553 B2* | 5/2020 | Baek | F02D 41/0052 |
| 2006/0037244 A1* | 2/2006 | Clawson | C01B 3/503 |
| | | | 48/61 |
| 2014/0007614 A1* | 1/2014 | Thacker | B01D 53/047 |
| | | | 62/617 |

(Continued)

FOREIGN PATENT DOCUMENTS

JP 2007-056813 A 3/2007

*Primary Examiner* — Joseph J Dallo
*Assistant Examiner* — Kurt Philip Liethen
(74) *Attorney, Agent, or Firm* — Leydig, Voit & Mayer, Ltd.

(57) ABSTRACT

A system and method for co-production of hydrogen and electrical power includes operating an engine having an electrical power generator connected thereto, and a hydrogen gas production plant, from a single source of gaseous fuel such that hydrogen extracted from a heated reformate provided by a partial oxidation catalyst is removed and collected for storage or sale while a tail gas is recirculated to an engine inlet to reduce NOx emissions during engine operation.

19 Claims, 3 Drawing Sheets

(56) References Cited

U.S. PATENT DOCUMENTS

| | | | |
|---|---|---|---|
| 2014/0109844 A1* | 4/2014 | Wall | F02M 21/0287 |
| | | | 123/3 |
| 2015/0307351 A1* | 10/2015 | Mabrouk | B01J 19/2485 |
| | | | 252/373 |
| 2017/0191412 A1 | 7/2017 | Tsai et al. | |
| 2018/0030907 A1 | 2/2018 | Bhosekar et al. | |

* cited by examiner

HYDROGEN AND ELECTRIC POWER CO-PRODUCTION SYSTEM AND METHOD

TECHNICAL FIELD

This disclosure relates generally to gaseous hydrogen production systems and, more particularly, to a hydrogen production system using gas reformation.

BACKGROUND

There are currently numerous uses for gaseous hydrogen, including use of hydrogen in fuel cells for clean and efficient power generation. Understandably, systems and methods for producing hydrogen have been developed in recent years to meet ever increasing hydrogen consumption and use needs.

Accordingly, various methods for producing hydrogen have been proposed in the past. One example can be seen in EP 1620906 B1 to Sridhar et al., which is entitled "Co-Production of Hydrogen and Electricity in a High Temperature Electrochemical System." This reference, describes use of a high-temperature solid oxide fuel cell that uses a carbon containing fuel source and a hydrogen separator adapted to separate a portion of hydrogen from a fuel side exhaust stream while the solid oxide fuel cell operates in a fuel cell mode and recirculate at least a first portion of the separated hydrogen into a fuel inlet gas stream of the solid oxide fuel cell. The reference further describes using a hydrogen storage/use subsystem operatively connected to the hydrogen separator which is adapted to store at least a second portion of hydrogen received from the hydrogen separator or a hydrogen storage/use subsystem operatively connected to the hydrogen separator which is adapted to provide at least a second portion of hydrogen received from the hydrogen separator to a hydrogen using device.

While the systems and methods described in the Sridhar reference are at least partially effective in producing electrical power and hydrogen, the scale of production of hydrogen is extremely limited and, for most practical applications, is limited to electrical power and hydrogen production for use internally by the system and requires external sources, for example, a connection to an electrical grid, to produce excess hydrogen for sale or external use.

SUMMARY

The disclosure describes, in one aspect, a hydrogen gas production plant. The plant includes a gaseous fuel supply conduit, a compressor having an inlet and an outlet, a mixer having inlets in fluid communication with the gaseous fuel supply conduit and the outlet of the compressor, and a heater having an inlet in fluid communication with an outlet of the mixer. The plant additionally includes a partial oxidation reforming catalyst (POx-R) in fluid communication with the heater along a supply passage and a return passage, and a hydrogen separation membrane (HSM) having an inlet in fluid communication with an outlet of the heater, the HSM having a hydrogen gas outlet and a tail gas outlet. The tail gas outlet is fluidly connected to the inlet of the compressor.

In another aspect, the disclosure describes a hydrogen gas and electrical power co-production system. The system includes a gaseous fuel supply conduit, and an internal combustion engine connected to the fuel supply conduit. The internal combustion engine includes an output shaft and a compressor having an inlet and an outlet. An electrical power generator is connected to the output shaft of the internal combustion engine and is operable to produce electrical power when the internal combustion engine is operating.

A hydrogen production module (HPM) associated with the internal combustion engine includes a mixer having a first inlet in fluid communication with the gaseous fuel supply conduit and a second inlet in fluid communication with the outlet of the compressor, a recuperative heat heater having an inlet in fluid communication with an outlet of the mixer, a partial oxidation reforming catalyst (POx-R) in fluid communication with an the recuperative heat heater along a supply passage, through which fluids pass to the Pox-R from the recuperative heat heater, and a return passage, through which a portion of those fluids return to the recuperative heat heater to be mixed with other fluids present therein, and a hydrogen separation membrane (HSM) having an inlet in fluid communication with an outlet of the recuperative heat heater, the HSM having a hydrogen gas outlet and a tail gas outlet. The tail gas outlet is fluidly connected to the inlet of the compressor.

In yet another aspect, the disclosure describes a method for generating hydrogen gas. The method includes compressing an inlet fluid comprising a mixture of fresh air and tail gas in a compressor, diverting a portion of the inlet fluid to a mixer, and providing a remaining portion of the inlet fluid to operate an engine that powers an electrical power generator, mixing the portion of inlet fluid provided to the mixer with a gaseous fuel to yield a fuel-air mixture, heating the fuel-air mixture in a heater, adding a portion of a reformate to the fuel-air mixture in the heater, feeding a partial oxidation catalyst with fluids from the heater to produce the reformate, and mixing a portion of the reformate with the fuel-air mixture, providing a remaining portion of the reformate to a hydrogen separation membrane (HSM), extracting a portion of hydrogen gas contained in the reformate using the HSM from a tail gas, and recirculating the tail gas to an inlet of the compressor.

DETAILED DESCRIPTION

This disclosure relates to systems and methods that combine and engine-driven generator for producing electrical power, and a fuel reformer system that is associated with the engine of the engine-driven generator to produce hydrogen for use to reduce engine emissions and also for excess production that can be collected and used externally to the system. The systems and methods described herein can be advantageously scaled to alter their electrical power output and also their hydrogen production output dynamically during operation.

Conceptually, the presently disclosed systems and methods fill integration and technology gaps at the component level for a system architecture designed for the co-production of low-cost hydrogen for transportation and low-emissions electric power. For example, the systems are scalable (as small as 70 kg/day, as large as 2150 kg/day), flexible (able to deliver between 14 kg/day and 35 kg/day per 100 ekW), and capable of distributed generation at the site of dispensing.

Figure 1:
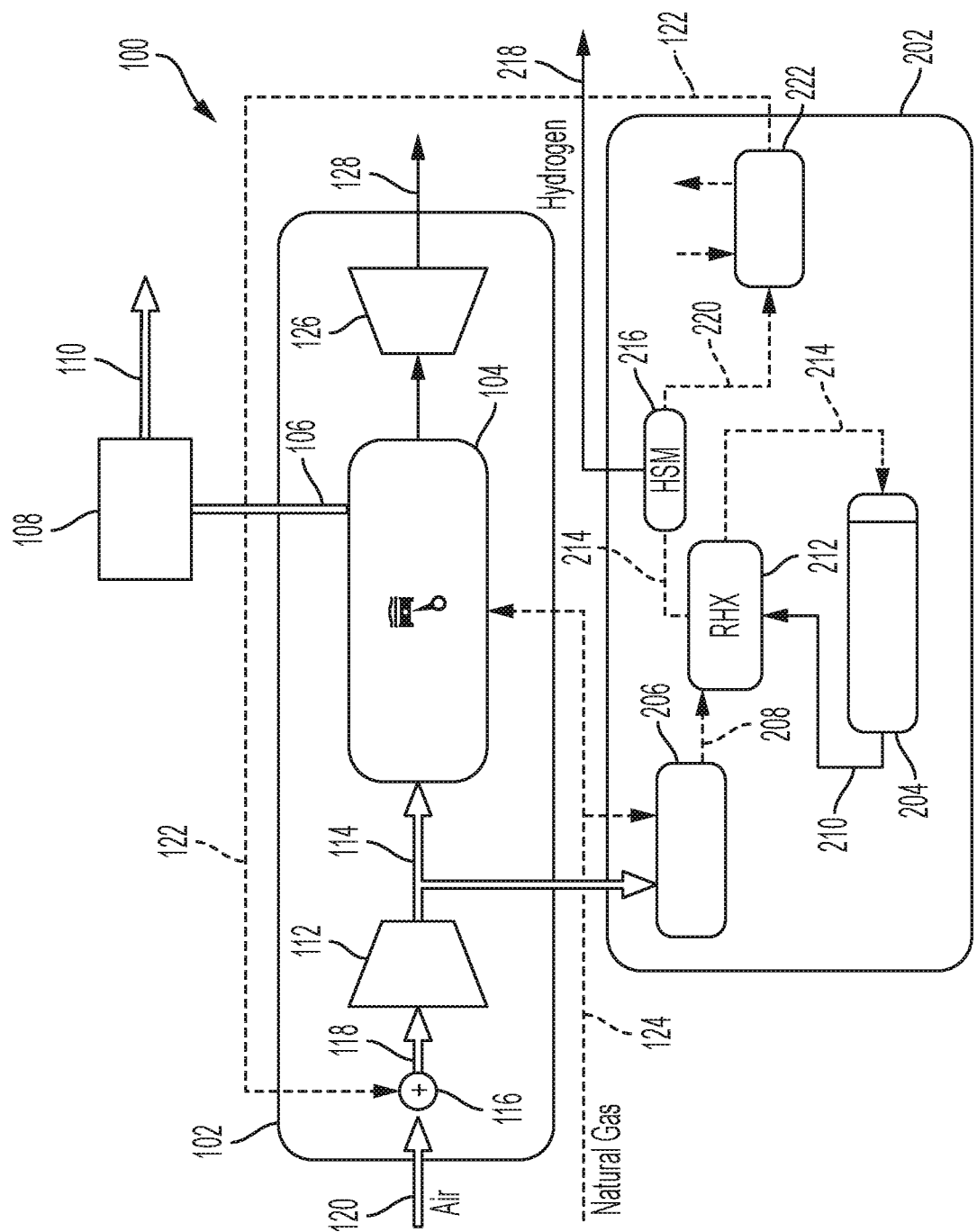
FIG. 1 is a schematic view of a co-production system in accordance with the disclosure.

A schematic view of a co-production system 100 in accordance with the disclosure is shown in FIG. 1. The system 100 includes an engine 102, for example, a gas-operated reciprocating piston internal combustion engine, which includes a cylinder case 104, although other engine types such as continuous combustion or turbine engines may be used. In the traditional fashion, the cylinder case 104 can include a plurality of reciprocating pistons that compress and oxidize or combust a combustible mixture containing air with a fuel in mixture, and provide exhaust gas, as a byproduct, and mechanical power to an output shaft 106. In the illustrated embodiment, the output shaft 106 is connected to an electrical power generator 108 that provides an electrical power output 110 during operation of the engine 102.

As shown, the engine 102 further includes a compressor 112, which compresses an engine operating fluid provided through an inlet duct 114. The engine operating fluid in the embodiment shown in a mixture provided by a mixer 116 through a mixed conduit 118, and comprises air provided through an air inlet 120 and hydrogen gas provided through a recirculation conduit 122. A gaseous fuel to operate the engine 102, for example, natural gas or another gaseous fuel, is provided through a gas conduit 124 to the cylinder case 104, and exhaust gas created during operation passes through a turbine 126, which also provides the power to operate the compressor 112, before being expelled to the environment through an exhaust conduit or stack 128.

The engine 102 is associated with a hydrogen production module (HPM) 202. The HPM 202 advantageously communicates and is operably associated with the engine 102 to, together, define the system 100. The HPM 202 includes various components that selectively and scaleably produce, refine and/or purify or separate hydrogen gas from gaseous fuel, for example the natural gas provided through the gas conduit 124. In one embodiment, the HPM 202 further includes or incorporates a diffusion barrier coating (DBC), such as the coating described in U.S. Pat. No. 10,260,460, which is incorporated herein in its entirety by reference, which improves improve the efficiency, durability, and sulfur tolerance of the catalyst(s) included in the HPM 202.

In the illustrated embodiment, the HPM 202 includes a partial oxidation reformer (POx-R) 204 catalyst or system to convert the rich gaseous fuel-air mixture at high temperature to a hydrogen-rich reformate 210. In the illustrated embodiment, a fuel-air mixture 208 is created at a mixer 206, which receives fuel from the gas conduit 124 and also engine operating fluid containing air and recirculated hydrogen from the inlet duct 114. The fuel-air mixture 208 is provided to a heater, for example, a high temperature recuperative heat exchanger (RHX) 212, which, during operation, preheats the rich fuel-air mixture 208 that is provided to the POx-R 204, along a portion of heated reformate 214. In this way, conversion efficiency at the POx-R 204 is increased. In one embodiment, the RHX 212 is arranged along an exhaust conduit of the engine 102 such that heated exhaust gas is used to heat the mixture passing through the RHX 212. The connection to the exhaust system of the engine can be upstream or downstream of the turbine 126 or other exhaust components of the engine (not shown) such as catalysts, after-treatment devices, exhaust heaters, mufflers and the like.

A hydrogen-selective separation membrane (HSM) 216 device receives reformate 214 from the RHX 212, which may still be heated or reheated, and extracts between 0% and 75% of the hydrogen from the reformate 214. The extracted hydrogen 218, which is pure hydrogen gas ($H_2$), is provided at a dedicated conduit and can be collected for storage or removal off system. A hydrogen-depleted tail gas mixture 220, which may contain traces of hydrogen, carbon monoxide, nitrogen, etc. is recirculated through conduit 122 after passing through an air to water cooler 222, which in the illustrated embodiment that is provided by jacket water from the engine 102 and which may alternatively be embodied in different ways, for example, an air to air cooler. The tail gas mixture 220 provided from the 216 may contain between 25% and 100% of the original hydrogen (plus CO, non-selective combustion products, and N2).

The engine inlet fluid 118, which contains the tail-gas 220 and, specifically, any remaining hydrogen gas contained within the tail gas 220, may advantageously operate under a stable and efficient lean-burn combustion mode required for ultra-low NOx emission. The air-system on the engine 102 is optimized to provide air for both engine operation and the POx-R 204, given that the engine air system and, specifically, the compressor 112, drives air flow to the mixer 206 and, from there, the POx-R 204. It can be appreciated that the various components of the HPM 202 can be sized to meet hydrogen production and separation targets across a range of potential operating conditions, while still allowing engine operation that produces low NOx emissions. For example, in one functional combination, 500 ekW of electrical power can be produced at a hydrogen production flexibility ranging between 70 to 180 kg/day hydrogen production while keeping engine out NOx levels at or below 0.05 g NOx/bhp-hr.

Figure 2:
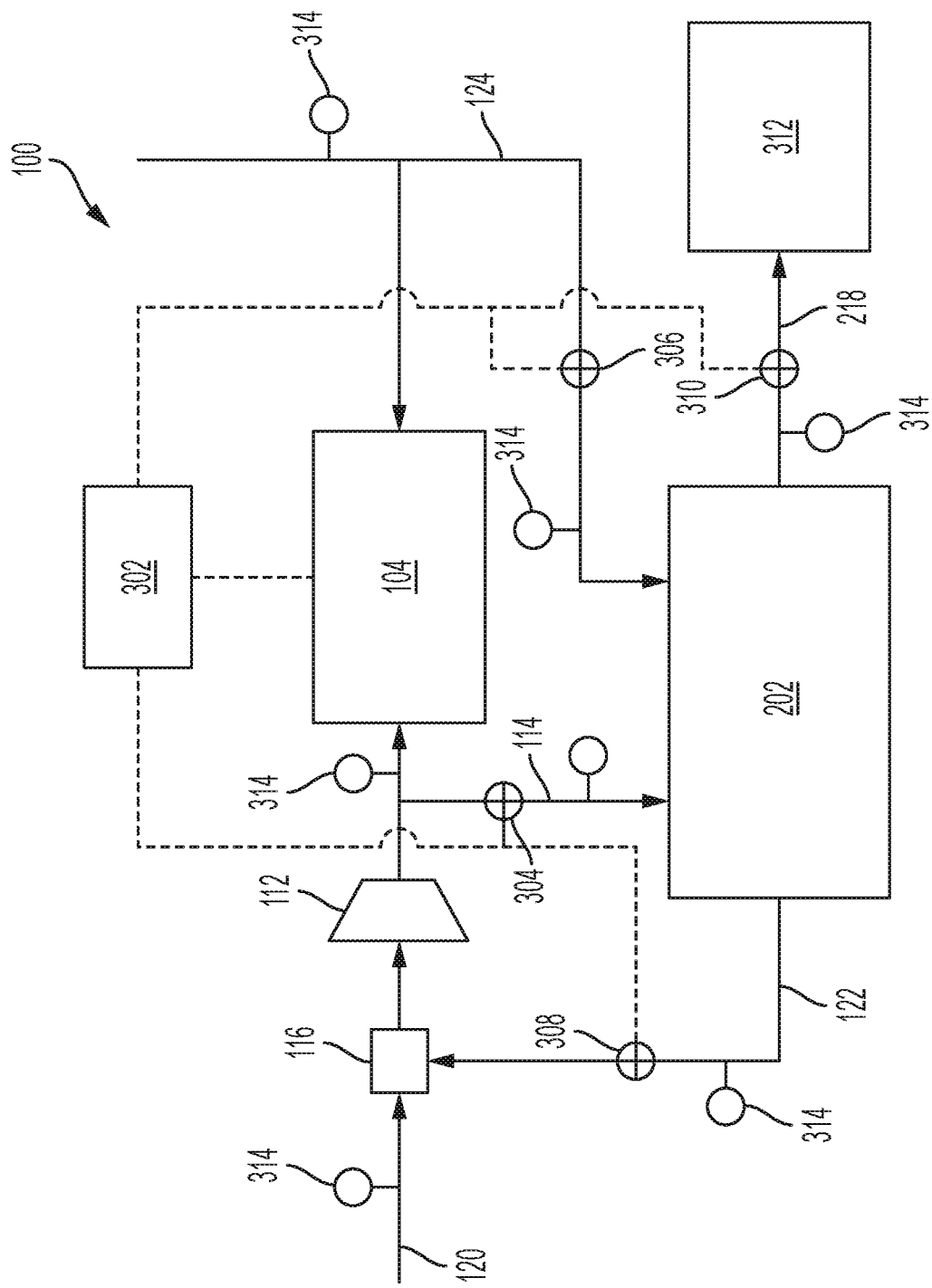
FIG. 2 is a diagram view of a co-production system in accordance with the disclosure.

A simplified diagram for the system 100 is shown in FIG. 2. In this embodiment, the system 100 includes control valves and sensors that operate according to commands provided by one or more controllers to effect a selective balancing between electrical power and hydrogen production. For simplicity, components and systems previously shown and described relative to FIG. 1 are denoted by the same reference numerals in FIG. 2 as previously used, although shown in schematic form. In this embodiment, a system of valves is used to throttle or control the rate of hydrogen production at times when an increase in engine power and, thus, electrical power is required. The various adjustments are made by a controller 302, which may also control operation of the HPM 202 and the engine 102.

More specifically, an inlet fluid control valve 304 is disposed along the leg of the inlet fluid conduit or inlet duct 114 to control the flow of inlet fluid to the HPM 202. When hydrogen production is increased, the valve 304 is opened to increase the flow of inlet fluid into the HPM 202. When an increase in engine or electrical power is requested, the valve 304 may close to constrict and, thus, decrease the flow if inlet fluid diverted from the engine and provided to the HPM such that more air is available for engine combustion. A gas control valve 306 disposed along the gas conduit 124 operates in a similar fashion, as does a tail gas valve 308 disposed along the tail gas conduit 122 and a hydrogen valve 310 disposed along a conduit carrying hydrogen gas 218 to a storage facility 312. Sensors 314 may also be used to detect flow, temperature, pressure and/or quality or composition of the various fluids circulating through the system 100 such that the controller 302 can perform fine adjustments during operation.

Figure 3:
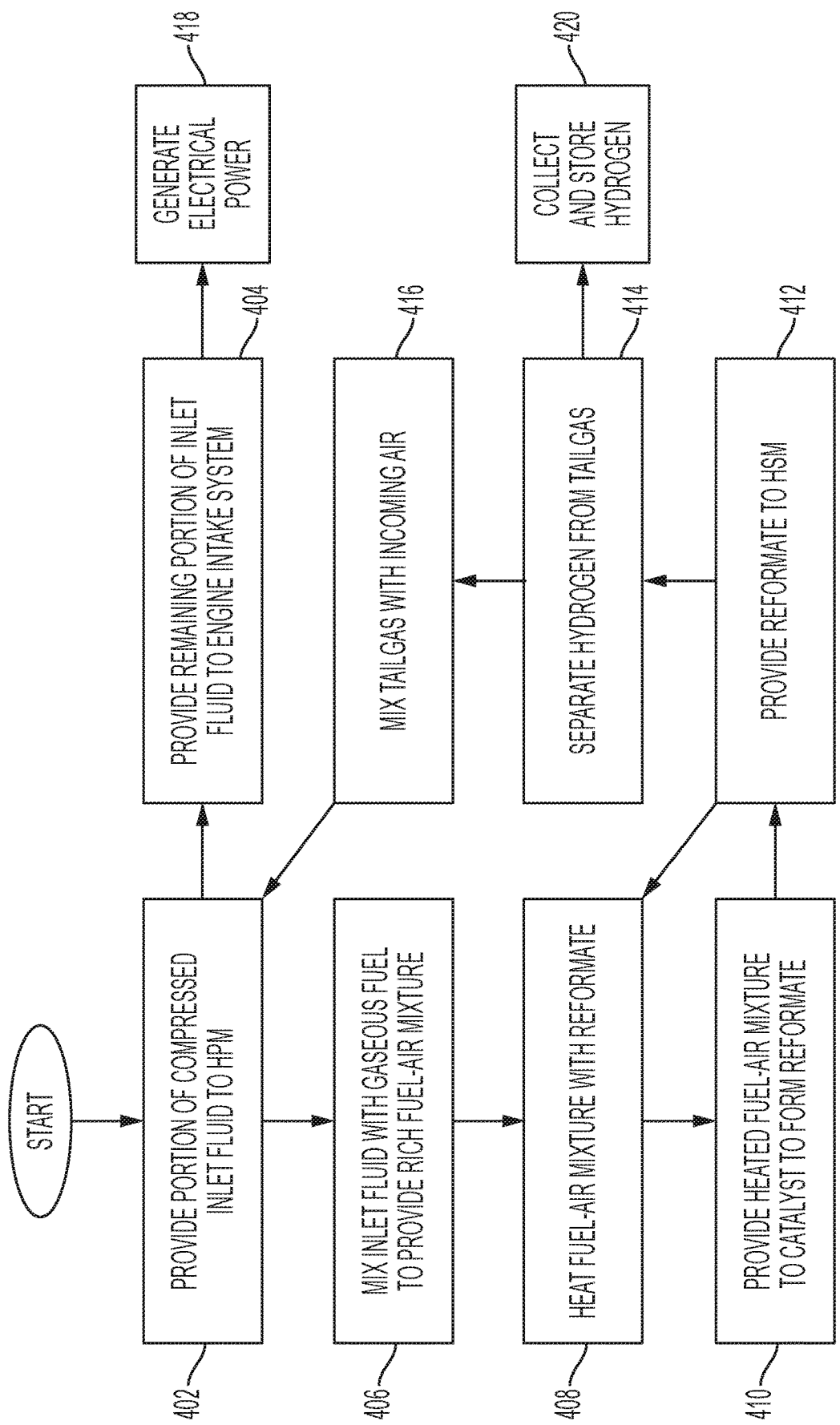
FIG. 3 is a flowchart for a method in accordance with the disclosure.

A flowchart for a method of operating a combined hydrogen/electrical power production plant is shown in FIG. 3. The method includes providing a portion of a compressed inlet fluid to a hydrogen production module (HPM) at 402, and a remaining portion to an engine intake system at 404. In the HPM, the inlet fluid is mixed with a gaseous fuel at 406 to provide a rich fuel-air mixture, which is heated at 408 and mixed with a reformate before being provided to a catalyst at 410. The catalyst creates a reformate flow at 412, a portion of which is mixed with the rich fuel-air mixture at 408, and a remaining portion of which is provided to a hydrogen-selective separation membrane (HSM) at 414. Hydrogen is separated from a tail gas at 416, and the tail gas is mixed with incoming air at 418 to form the inlet fluid, which is compressed. The method optionally further includes controlling a flow of at least one of the inlet fluid, gaseous fuel, hydrogen and/or tail gas to selectively control increase engine or electrical power, and hydrogen produced at 416. Engine power during operation can be used to generate electrical power at 420, and the hydrogen extracted can be collected and stored for use or sale at 422.

INDUSTRIAL APPLICABILITY

The combined engine 102 and HPM 202 system, and the integration of a hydrogen production plant in conjunction with electrical power generation it provides, presents a simple and cost-effective solution for hydrogen production. Controls allow for variations in electric power demand and hydrogen demand. The HPM structures are also advantageous over known systems. For example, hydrogen generation via traditional steam methane reforming (SMR) is susceptible to catastrophic poisoning of the catalyst by sulfur, and requires prior processes to strip out or remove sulfur from the incoming natural gas prior to reaction on the catalyst. Partial oxidation reforming (POx-R) is less sensitive to sulfur relative to SMR, but still impacted such that levels seen in many renewable biogas streams (up to 500 ppm) and even pipelines (up to 10 ppm) can reduce the performance and life of a POx-R catalyst. The HPM described herein may utilize a diffusion Barrier Coat and DBC, as described, for example, in U.S. Pat. No. 9,987,612, which is incorporated herein in its entirety. In this way, the engine 102 may operate at these levels of sulfur in the fuel gas with significant reduction of the performance impact.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hydrogen gas production plant, comprising:
   a gaseous fuel supply conduit;
   a compressor having an inlet and an outlet;
   an internal combustion engine having an intake system in fluid communication with the outlet of the compressor;
   a mixer having a first inlet in fluid communication with the gaseous fuel supply conduit and a second inlet in fluid communication with the outlet of the compressor;
   a heater having an inlet in fluid communication with an outlet of the mixer;
   a partial oxidation reforming catalyst (POx-R) in fluid communication with the heater along a supply passage and a return passage;
   a hydrogen separation membrane (HSM) having an inlet in fluid communication with an outlet of the heater, the HSM having a hydrogen gas outlet and a tail gas outlet;
   wherein the tail gas outlet is fluidly connected to the inlet of the compressor.

2. The hydrogen gas production plant of claim 1, wherein the engine further comprises a turbine operated by exhaust gas produced by the engine and connected to power the compressor.

3. The hydrogen gas production plant of claim 2, wherein the engine includes a plurality of cylinders disposed to receive gas from the gaseous fuel supply conduit for use during engine operation.

4. The hydrogen gas production plant of claim 1, wherein the heater is a recuperative heat heating device that transfers heat from engine exhaust gas to fluids provided at the outlet of the mixer.

5. The hydrogen gas production plant of claim 1, further comprising a cooler disposed to cool tail gas between the HSM and the inlet of the compressor.

6. The hydrogen gas production plant of claim 1, further comprising one or more valves disposed to selectively control a flow of fluid provided to the Pox-R.

7. The hydrogen gas production plant of claim 6, further comprising an electrical power generator connected on an output shaft of the engine.

8. The hydrogen gas production plant of claim 7, further comprising an electronic controller disposed to operate the one or more valves such that an amount of hydrogen gas provided at the hydrogen gas outlet is controlled based on an electrical power output provided by the electrical power generator.

9. The hydrogen gas production plant of claim 1, further comprising an inlet mixer disposed to mix an incoming airflow and tail gas to yield an inlet fluid provided to the inlet of the compressor during operation.

10. A hydrogen gas and electrical power co-production system, comprising:
    a gaseous fuel supply conduit;
    an internal combustion engine connected to the fuel supply conduit, the internal combustion engine including an output shaft and a compressor having an inlet and an outlet;
    an electrical power generator connected to the output shaft of the internal combustion engine and operable to produce electrical power when the internal combustion engine is operating;
    a hydrogen production module (HPM), comprising:
       a mixer having a first inlet in fluid communication with the gaseous fuel supply conduit and a second inlet in fluid communication with the outlet of the compressor;
       a recuperative heat heater having an inlet in fluid communication with an outlet of the mixer;
       a partial oxidation reforming catalyst (POx-R) in fluid communication with an the recuperative heat heater along a supply passage, through which fluids pass to the Pox-R from the recuperative heat heater, and a return passage, through which a portion of those fluids return to the recuperative heat heater to be mixed with other fluids present therein;

a hydrogen separation membrane (HSM) having an inlet in fluid communication with an outlet of the recuperative heat heater, the HSM having a hydrogen gas outlet and a tail gas outlet;

wherein the tail gas outlet is fluidly connected to the inlet of the compressor.

11. The system of claim 10, wherein the internal combustion engine includes a plurality of cylinders disposed to receive gas from the gaseous fuel supply for use during engine operation.

12. The system of claim 10, further comprising a cooler disposed to cool the tail gas between the HSM and the inlet of the compressor.

13. The system of claim 10, further comprising one or more valves disposed to selectively control a flow of fluid provided to the mixer.

14. The system of claim 13, further comprising an electronic controller disposed to operate the one or more valves such that an amount of hydrogen gas provided at the hydrogen gas outlet is controlled based on the electrical power output provided by the electrical power generator.

15. The system of claim 10, further comprising an inlet mixer disposed to mix an incoming airflow and tail gas to yield an inlet fluid provided to the inlet of the compressor during operation.

16. A method for generating hydrogen gas, comprising:
compressing an inlet fluid comprising a mixture of fresh air and tail gas in a compressor;
diverting a portion of the inlet fluid to a mixer, and providing a remaining portion of the inlet fluid to operate an engine that powers an electrical power generator;
mixing the portion of inlet fluid provided to the mixer with a gaseous fuel to yield a fuel-air mixture;
heating the fuel-air mixture in a heater;
adding a portion of a reformate to the fuel-air mixture in the heater;
feeding a partial oxidation catalyst with fluids from the heater to produce the reformate, and mixing a portion of the reformate with the fuel-air mixture;
providing a remaining portion of the reformate to a hydrogen separation membrane (HSM);
extracting a portion of hydrogen gas contained in the reformate using the HSM from a tail gas; and
recirculating the tail gas to an inlet of the compressor.

17. The method of claim 16, further comprising cooling the tail gas.

18. The method of claim 16, further comprising selectively adjusting a relative output level between the hydrogen gas produced at the HSM and electrical power provided by the electrical power generator.

19. The method of claim 18, wherein selectively adjusting the relative output level is accomplished by using one or more valves to adjust a flow rate of fluids provided through the POx-R.

* * * * *